United States Patent
Zaffetti et al.

(10) Patent No.: US 12,370,488 B2
(45) Date of Patent: Jul. 29, 2025

(54) CONFIGURATION FOR EXPEDITED FILLING AND EMPTYING OF AN AMINE BED

(71) Applicant: Hamilton Sundstrand Corporation, Charlotte, NC (US)

(72) Inventors: Mark A. Zaffetti, Suffield, CT (US); Daniel J. Kehoe, Coventry, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 1016 days.

(21) Appl. No.: 17/220,074

(22) Filed: Apr. 1, 2021

(65) Prior Publication Data

US 2022/0314159 A1    Oct. 6, 2022

(51) Int. Cl.
| | |
|---|---|
| *B01D 53/04* | (2006.01) |
| *A62B 11/00* | (2006.01) |
| *A62B 15/00* | (2006.01) |
| *A62B 19/00* | (2006.01) |
| *B01D 53/047* | (2006.01) |

(52) U.S. Cl.
CPC .......... *B01D 53/0415* (2013.01); *A62B 11/00* (2013.01); *A62B 15/00* (2013.01); *A62B 19/00* (2013.01); *B01D 53/047* (2013.01); *B01D 2257/504* (2013.01)

(58) Field of Classification Search
CPC .............. B01D 53/047; B01D 53/0407; B01D 53/0415; B01D 2257/504; B01D 2258/06; B01D 2259/4575
USPC .................................. 95/96; 96/97, 130, 143
See application file for complete search history.

(56) References Cited

U.S. PATENT DOCUMENTS

| | | | |
|---|---|---|---|
| 4,046,529 A | 9/1977 | Fletcher et al. | |
| 2008/0233019 A1* | 9/2008 | Dean, II | B01D 53/0415 422/177 |
| 2010/0326275 A1* | 12/2010 | Sechrist | B01D 53/0446 95/96 |
| 2018/0126322 A1* | 5/2018 | O'Coin | A62B 11/00 |
| 2019/0255481 A1* | 8/2019 | O'Coin | B01D 53/0438 |

(Continued)

FOREIGN PATENT DOCUMENTS

| | | |
|---|---|---|
| EP | 3320962 A1 | 5/2018 |
| WO | 2015023678 A1 | 2/2015 |

OTHER PUBLICATIONS

European Search Report for Application No. 22154610.4, mailed Sep. 5, 2022, 7 pages.

(Continued)

*Primary Examiner* — Minh Chau T Pham
(74) *Attorney, Agent, or Firm* — CANTOR COLBURN LLP

(57) ABSTRACT

A swing bed absorption apparatus includes a bed including a bed housing including, an outer surface, an interior chamber, and a flared interior passageway fluidly connecting the interior chamber to an area located outside of the bed. The flared interior passageway includes an opening in the outer surface, a chamber opening at the interior chamber, a first portion located at the opening, the first portion being fluidly connected to the area located outside the bed through the opening, and a flared portion located at the chamber opening, the flared portion being fluidly connected to the interior chamber through the chamber opening. The flared portion connects to the interior chamber at an obtuse angle.

19 Claims, 5 Drawing Sheets

(56) References Cited

U.S. PATENT DOCUMENTS

2019/0374900 A1    12/2019  Beaumont et al.
2020/0061520 A1*    2/2020  O'Coin .............. B01D 53/0438

OTHER PUBLICATIONS

Chullen, et al. "Design and Development Comparison of Rapid Cycle Amine 1.0, 2.0, and 2.0" 46th International Conference on Environmental Systems (ICES-2016-073), Jul. 10-14, 2016, Vienna, Austria, 20 pages.

* cited by examiner

CONFIGURATION FOR EXPEDITED FILLING AND EMPTYING OF AN AMINE BED

STATEMENT OF FEDERAL SUPPORT

This invention was made with Government support under 80JSC020D0020 awarded by NASA. The Government has certain rights in the invention.

BACKGROUND

The subject matter disclosed herein relates generally to the field of removing carbon dioxide gas, and specifically to an apparatus for absorbing and removing carbon dioxide gas and humidity from an enclosed space.

Life support systems that are utilized in enclosed spaces such as submarines, spacecraft or space suits require the continuous removal of carbon dioxide. A regenerative carbon dioxide removal system is utilized for this purpose and commonly includes amine beds that are placed in contact with a flow of carbon dioxide laden air. The amine beds adsorb carbon dioxide from the air stream through commonly understood chemical processes and reactions.

An amine bed is utilized until it is saturated to a selected saturation level. The selected saturation level can be a saturation level where the amine bed can no longer efficiently remove carbon dioxide from an air stream or any saturation level less than the saturation level where the amine bed can no longer efficiently remove carbon dioxide from the air stream. Another amine bed is then switched into contact with the carbon dioxide laden air stream. The saturated amine bed is then desorbed to expel carbon dioxide in preparation for the next cycle.

BRIEF SUMMARY

According to one embodiment, a swing bed absorption apparatus is provided. The swing bed absorption apparatus includes a bed including a bed housing including, an outer surface, an interior chamber, and a flared interior passageway fluidly connecting the interior chamber to an area located outside of the bed. The flared interior passageway includes an opening in the outer surface, a chamber opening at the interior chamber, a first portion located at the opening, the first portion being fluidly connected to the area located outside the bed through the opening, and a flared portion located at the chamber opening, the flared portion being fluidly connected to the interior chamber through the chamber opening. The flared portion connects to the interior chamber at an obtuse angle.

In addition to one or more of the features described above, or as an alternative, further embodiments may include that the flared interior passageway further includes a straight portion interposed between the first portion and the flared portion, the straight portion fluidly connecting the first portion and the flared portion.

In addition to one or more of the features described above, or as an alternative, further embodiments may include that the flared portion directly connects to the first portion.

In addition to one or more of the features described above, or as an alternative, further embodiments may include that the flared portion is a countersink hole.

In addition to one or more of the features described above, or as an alternative, further embodiments may include that the first portion is a counterbore.

According to another embodiment, a method of manufacturing a swing bed absorption apparatus is provided. The method includes forming a bed by forming a bed housing including an outer surface and an interior chamber and forming a flared interior passageway. The flared interior passageway fluidly connecting the interior chamber to an area located outside of the bed. The flared interior passageway includes an opening in the outer surface, a chamber opening at the interior chamber, and a first portion located at the opening. The first portion being fluidly connected to the area located outside the bed through the opening. The flared interior passageway also includes a flared portion located at the chamber opening. The flared portion being fluidly connected to the interior chamber through the chamber opening. The flared portion connects to the interior chamber at an obtuse angle.

In addition to one or more of the features described above, or as an alternative, further embodiments may include that the forming the flared interior passageway further includes that a straight portion is formed. The straight portion being interposed between the first portion and the flared portion. The straight portion fluidly connects the first portion and the flared portion.

In addition to one or more of the features described above, or as an alternative, further embodiments may include that the forming the straight portion further includes drilling from the outer surface into the bed housing to form the straight portion.

In addition to one or more of the features described above, or as an alternative, further embodiments may include that the forming the flared interior passageway further includes forming the flared portion.

In addition to one or more of the features described above, or as an alternative, further embodiments may include that the forming the flared portion further includes machining a countersink hole from the chamber opening to form the flared portion.

In addition to one or more of the features described above, or as an alternative, further embodiments may include that the forming the flared portion further includes: drilling a hole in the outer surface into the bed housing to the interior chamber; inserting a backside spot face tool through the hole; extending a cutting blade from the backside spot face tool; and rotating the cutting blade to form the flared portion.

In addition to one or more of the features described above, or as an alternative, further embodiments may include that the flared portion is a countersink hole.

In addition to one or more of the features described above, or as an alternative, further embodiments may include that the forming the flared interior passageway further includes: forming the first portion.

In addition to one or more of the features described above, or as an alternative, further embodiments may include that the forming the first portion further includes machining a counter bore from the outer surface to form the first portion.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

Figure 1:
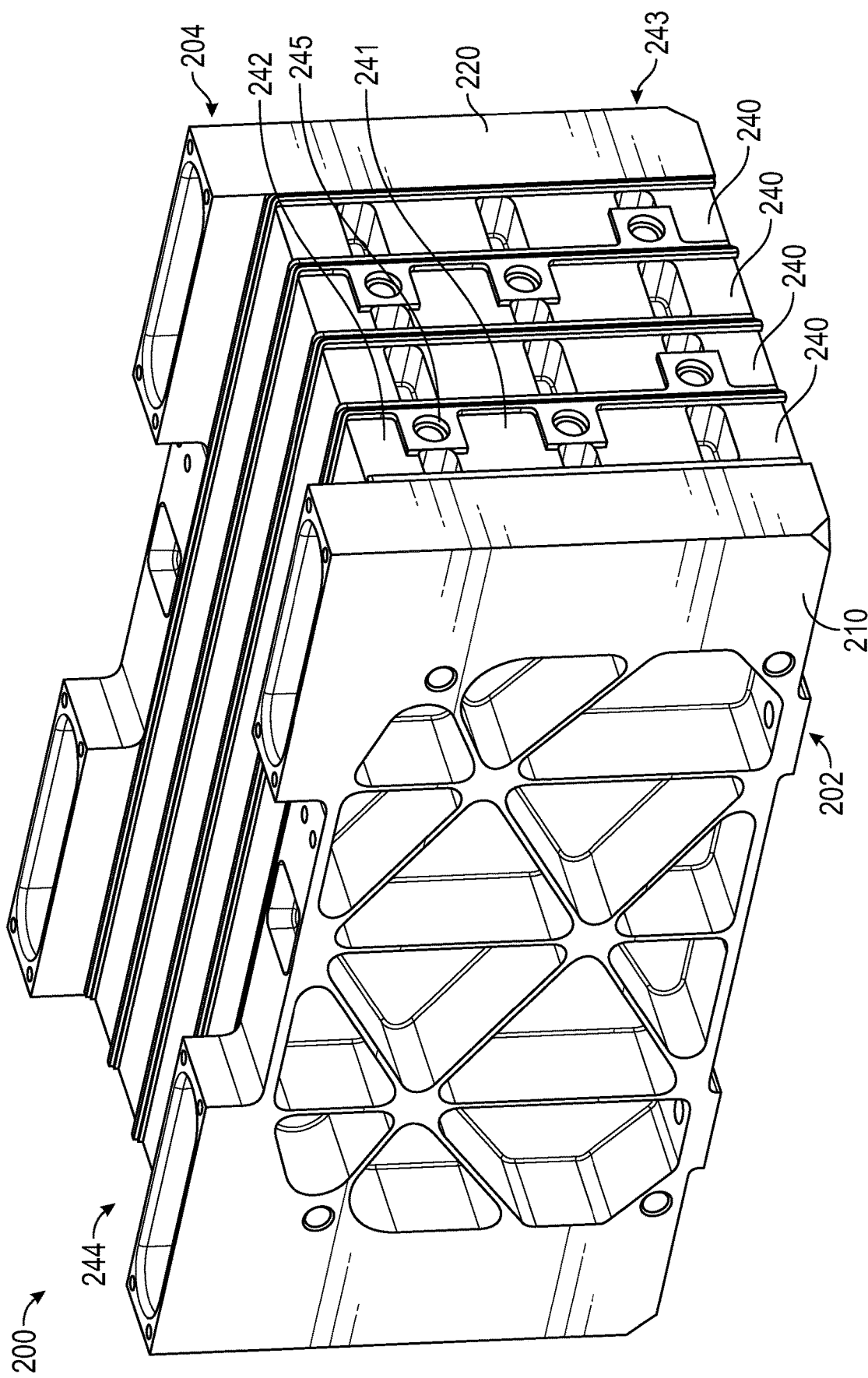
FIG. 1 illustrates an isometric view of a swing bed absorption apparatus, according to an embodiment of the present disclosure.

A detailed description of one or more embodiments of the disclosed apparatus and method are presented herein by way of exemplification and not limitation with reference to the Figures.

An amine bed for a swing bed absorption apparatus is typically constructed with a metal foam filled with amine-based sorbent beads. The metal foam creates a treacherous path to trap in the amine-based sorbent beads. The metal foam also serves additional functions. First, the absorbing and desorbing process includes heat transfer and so the metal foam allows the heat generated to be transferred to the adjacent amine bed. Second, having the amine-based sorbent beads touching the metal foam is beneficial from this perspective. The metal foam also acts as a structural member to be able to react loads that the assembly needs to withstand during launch and during operation. The amine beds are pressurized as compared to an external vacuum environment (such as during a spacewalk).

Upon construction of the amine beds the amine-based sorbent beads are flowed into the metal foam through a fill port and fill throughout the treacherous path of the metal foam. The metal foam decreases the area of the fill port because the foam contacts the closure bar where the fill port is located. Since the foam structure is random the percent of blockage of the fill port is variable. The filling of the amine-based sorbent beads often takes a great deal of time because it is difficult for the amine-based sorbent beads to make their way through the treacherous path of the metal foam and some certain percent of the fill port is blocked by the foam. When the amine-based sorbent beads have reached the end of their usable life the amine-based sorbent beads need to be removed from the metal foam and replaced. Embodiments disclosed herein seek to decrease the time it takes for the amine-based sorbent beads to be installed into the metal foam and removed from the metal foam by adding a conical feature to the fill port, which increases the exposed area of metal foam and results in a lower percentage of the fill port being blocked or a higher percentage of open area in the fill port Referring now to FIG. 1, an isometric view of a swing bed absorption apparatus 200 is illustrated, according to an embodiment of the present disclosure. The swing bed absorption apparatus 200 is composed of two or more beds 240. The two or more beds 240 are formed stacked on top of each other. The swing bed absorption apparatus 200 of FIG. 1 includes four beds 240. It is understood that while the exemplary swing bed absorption apparatus 200 of FIG. 1 includes four beds 240, the embodiments disclosed herein may be applicable to a swing bed absorption apparatus 200 with two or more beds 240.

The beds 240 are sandwiched together by a first end portion 210 and a second end portion 220. The first end portion 210 is located at a first end 202 of the swing bed absorption apparatus 200 and the second end portion 220 is located at a second end 204 of the swing bed absorption apparatus 200. Each of the beds 240 is composed of a bed housing 242 that contains a metal foam and amine-based sorbent beads to absorb carbon dioxide.

Each bed housing 242 includes an outer surface 241. Each bed housing 242 includes one or more openings 245 in an outer surface 241 on a first side 243 of the bed housing 242. The openings 245 serve as openings to interior passageways for filling and/or emptying ports for the amine based sorbent beads. Although not visible in FIG. 1, there are also openings in the outer surface 241 on a second side 244 of the bed housing 242. The second side 244 is located opposite the first side 243.

Figure 3:
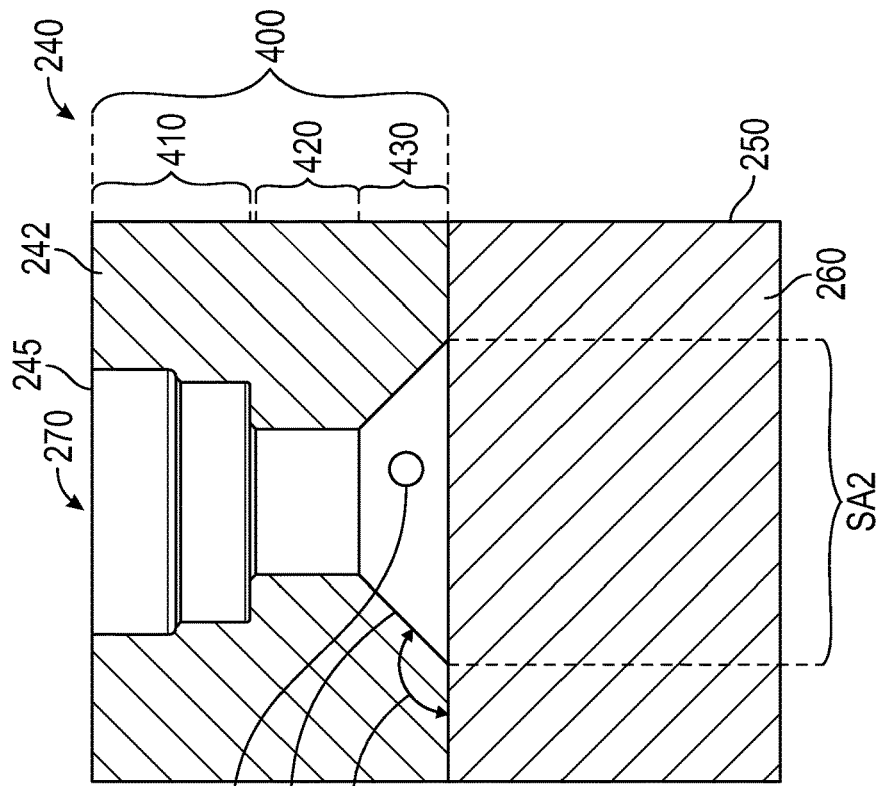
FIG. 3 illustrates a cross-sectional view of a bed of the swing bed absorption apparatus, in accordance with an embodiment of the present disclosure.
Figure 2:
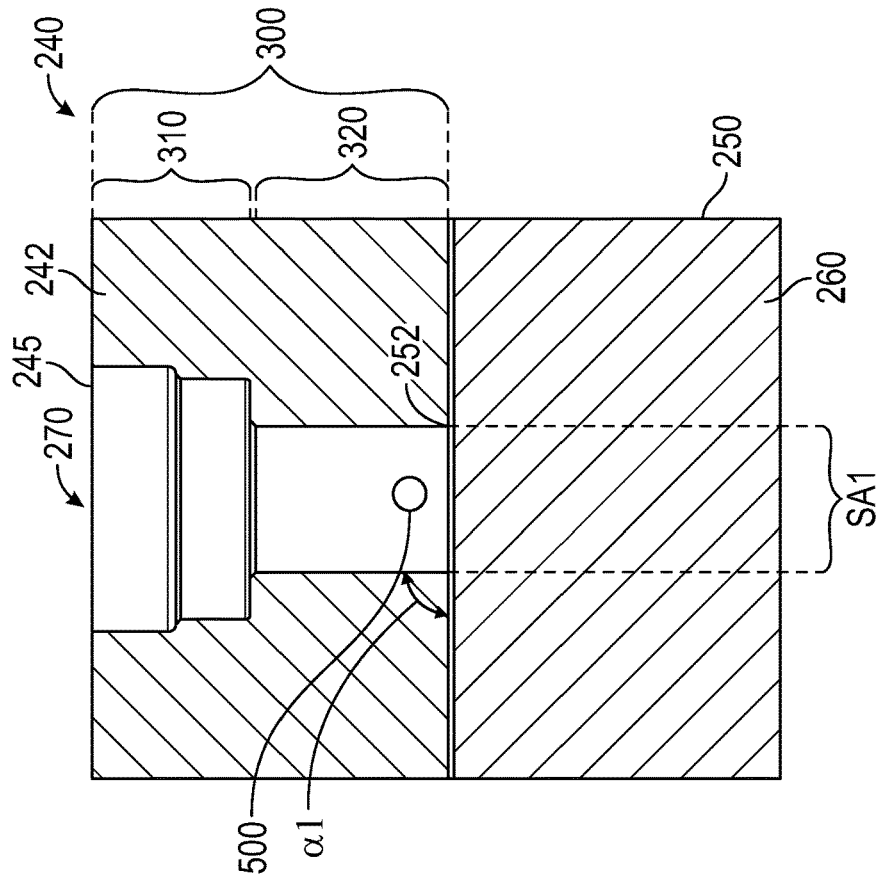
FIG. 2 illustrates a cross-sectional view of a bed of the swing bed absorption apparatus, in accordance with an embodiment of the present disclosure.

Referring now to FIG. 2, with continued reference to FIGS. 1 and 2, a cross-sectional view of a straight interior passageway 300 is illustrated in FIG. 2 and a cross-sectional view of a flared interior passageway 400 is illustrated in FIG. 3. The bed housing 242 forms an interior chamber 250 within the bed housing 242. The interior chamber 250 is configured to contain the metal foam 260 and the amine-based sorbent beads 500 within the metal foam 260. The straight interior passageway 300 fluidly connects the interior chamber 250 to an area 270 located outside of the bed 240. The flared interior passageway 400 fluidly connects the interior chamber 250 to the area 270 located outside of the bed 240.

The straight interior passageway 300 is located within the bed housing 242 and fluidly connects the opening 245 to an interior chamber 250 containing the metal foam 260. The straight interior passageway 300 includes a first portion 310 located at the opening 245 and a straight portion 320 located at the interior chamber 250. The first portion 310 may be a counterbore configured to receive a plug, with seals, that is attached after the amine based sorbent beads 500 are filled into the chamber 250 to keep the amine based sorbent beads 500 from spilling out and to allow the interior chamber 250 to be pressurized with respect to the exterior area 270. The straight portion 320 may connect to the interior chamber 250 at a right angle $\alpha 1$ as measured through the bed housing 242, as illustrated in FIG. 2. A right angle is defined as an angle that is equal to 90 degrees. The straight portion 320 is fluidly connected to the interior chamber 250 at a chamber opening 252.

The flared interior passageway 400 is located within the bed housing 242 and fluidly connects the opening 245 to an interior chamber 250 containing the metal foam 260. The flared interior passageway 400 includes a first portion 410 located at the opening 245 and a flared portion 430 located at the interior chamber 250. The first portion 410 is configured to receive a plug, with seals, that is attached after the amine based sorbent beads 500 are filled into the chamber 250 to keep the amine based sorbent beads 500 from spilling out and to allow the interior chamber 250 to be pressurized with respect to the exterior area 270. The flared interior passageway 400 may includes a straight portion 420 interposed between the first portion 410 and the flared portion 430. The straight portion 420 may fluidly connect the first portion 410 and the flared portion 430. In alternate embodiment, the flared interior passageway 400 may not include straight portion 420 and the flared portion 430 may be directly connected to the first portion 410. The first portion 410 may be a counterbore configured to receive a plug, with seals, that is attached after the amine based sorbent beads 500 are filled into the chamber 250 to keep the amine based sorbent beads 500 from spilling out and to allow the interior chamber 250 to be pressurized with respect to the exterior area 270. The flared portion 430 connects to the interior chamber 250 at an obtuse angle α2 as measured through the bed housing 242, as illustrated in FIG. 3. An obtuse angle is defined as an angle that is greater than 90 degrees. The flared portion 430 may be a countersink hole. The flared portion 430 may also be any shape including a conical shape as illustrated in FIG. 3 or a parabolic shape. The flared portion 430 may include linear side walls to form the conical shape as illustrated in FIG. 3 or curvilinear sidewalls. The countersink hole may be formed by a backside spot face tool. It is understood that the flared portion may be formed by any other manufacturing process known to one of skill in the art, including, but not limited, to additive manufacturing. The flared portion 430 is fluidly connected to the interior chamber 250 at a chamber opening 252.

Advantageously, by flaring out the flared interior passageway 400 at the chamber opening 252 the amine-based sorbent beads 500 are exposed to more surface area of the metal foam 260 when entering the interior chamber 250 and thus the amine-based sorbent beads 500 will both fill the metal foam 260 within the interior chamber 250 and empty the metal foam 260 within the interior chamber 250 faster than in comparison to the straight interior passageway 300. This is clearly visible when comparing FIGS. 2 and 3, as the surface area SA1 of the metal foam 260 exposed by the straight interior passageway 300 is smaller than the surface area SA2 of the metal foam 260 exposed by the flared interior passageway 400.

Figure 4:
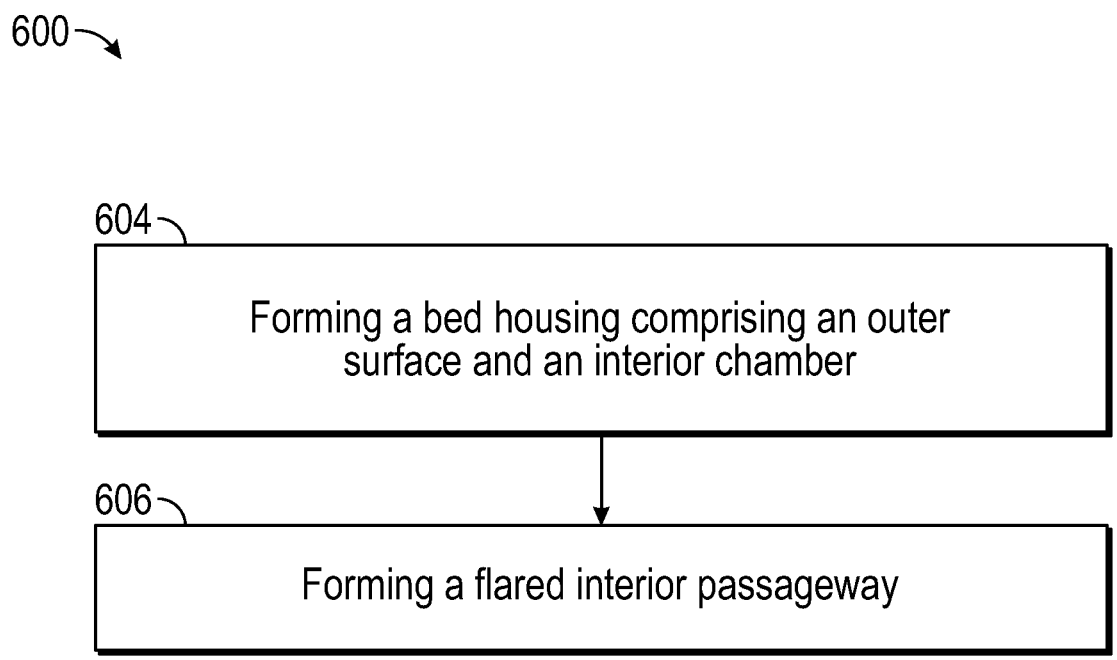
FIG. 4 illustrates a flow chart of a method of manufacturing the swing bed absorption apparatus, in accordance with an embodiment of the present disclosure.

Referring now to FIG. 4, with continued reference to FIGS. 1-3, a flow chart of method 600 of manufacturing the swing bed absorption apparatus 200 is illustrated, in accordance with an embodiment of the disclosure.

The method 600 of manufacturing the swing bed absorption apparatus 200 includes forming a bed 240. The bed 240 may be formed machining operations, drilling operations, additive manufacturing, or a combination thereof.

At block 604, a bed housing 242 comprising an outer surface 241 and an interior chamber 250 is formed. The bed housing 242 may be formed through additive manufacturing and/or machining. The bed housing 242 may also be formed using any other manufacturing process known to one of skill in the art.

At block 606, the flared interior passageway 400 is formed. The flared interior passageway 400 may be formed through additive manufacturing, machining, and/or drilling. The flared interior passageway 400 may also be formed using any other manufacturing process known to one of skill in the art. The flared interior passageway 400 fluidly connects the interior chamber 250 to an area 270 located outside of the bed 240, the flared interior passageway 400 includes an opening 245 in the outer surface 241, a chamber opening 252 at the interior chamber 250, and a first portion 410 located at the opening 245. The first portion 410 being fluidly connected to the area 270 located outside the bed 240 through the opening 245. The flared interior passageway 400 also includes a flared portion 430 located at the chamber opening 252. The flared portion being fluidly connected to the interior chamber 250 through the chamber opening 252. The flared portion 430 connects to the interior chamber 250 at an obtuse angle α2.

The flared interior passageway 400 may include forming a straight portion 420. The straight portion 420 being interposed between the first portion 410 and the flared portion 430. The straight portion 420 fluidly connects the first portion 410 and the flared portion 430. The straight portion 420 may not be present and the first portion 410 may directly connect to the flared portion 430. The straight portion 420 may be formed by drilling from the outer surface 241 into the bed housing 242.

Forming the flared interior passageway 400 may further include forming the flared portion 430. The flared portion 430 may be formed by machining a countersink hole 430a (see isometric view of countersink hole 430a in FIG. 6) from the chamber opening 252 to form the flared portion 430.

While the above description has described the flow process of FIG. 4 in a particular order, it should be appreciated that unless otherwise specifically required in the attached claims that the ordering of the steps may be varied and the order of the steps may occur simultaneously or near simultaneously, such as in layers.

Figure 5:
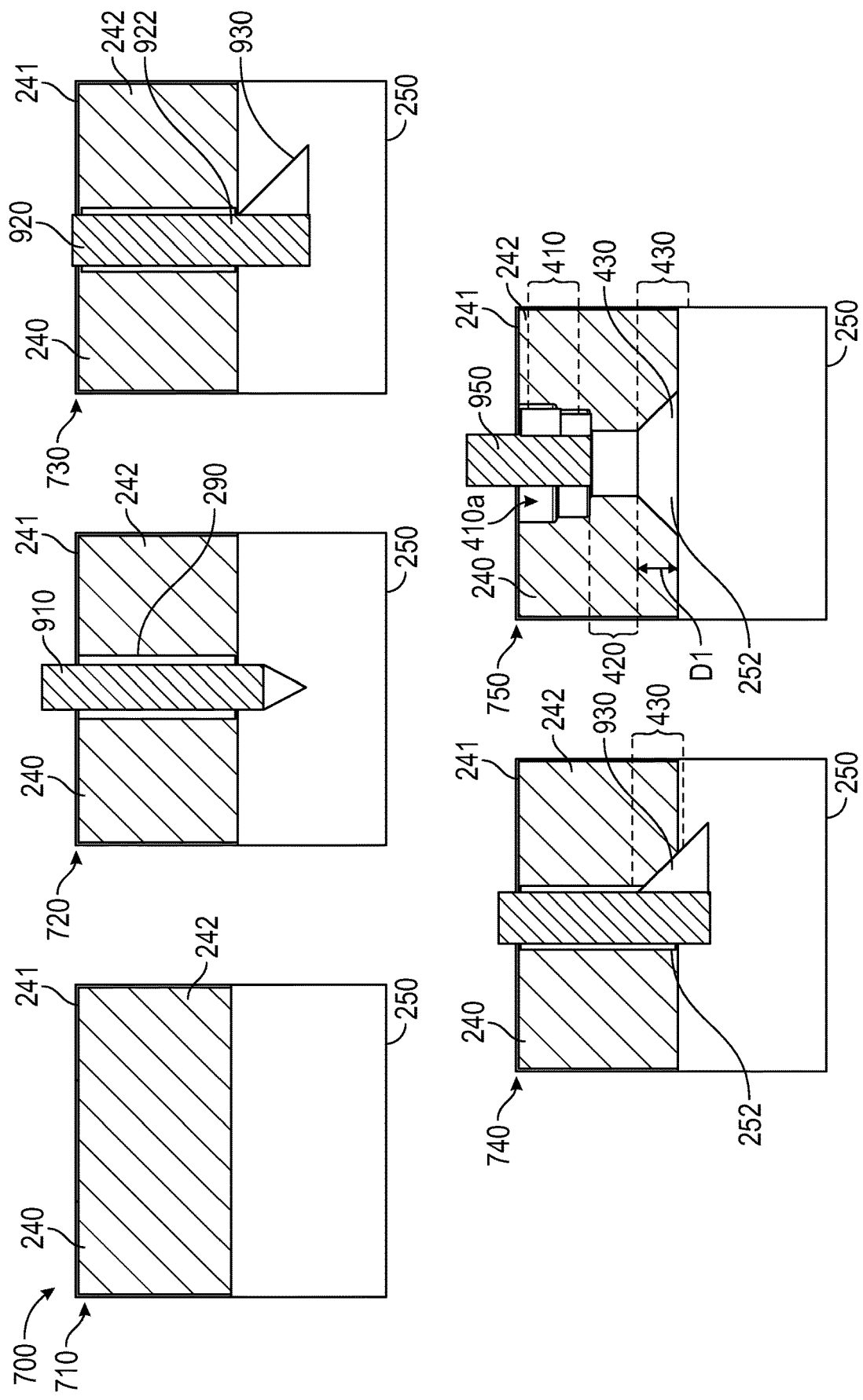
FIG. 5 illustrates a flow chart of a method of forming the flared interior passageway, in accordance with an embodiment of the present disclosure.
Figure 6:
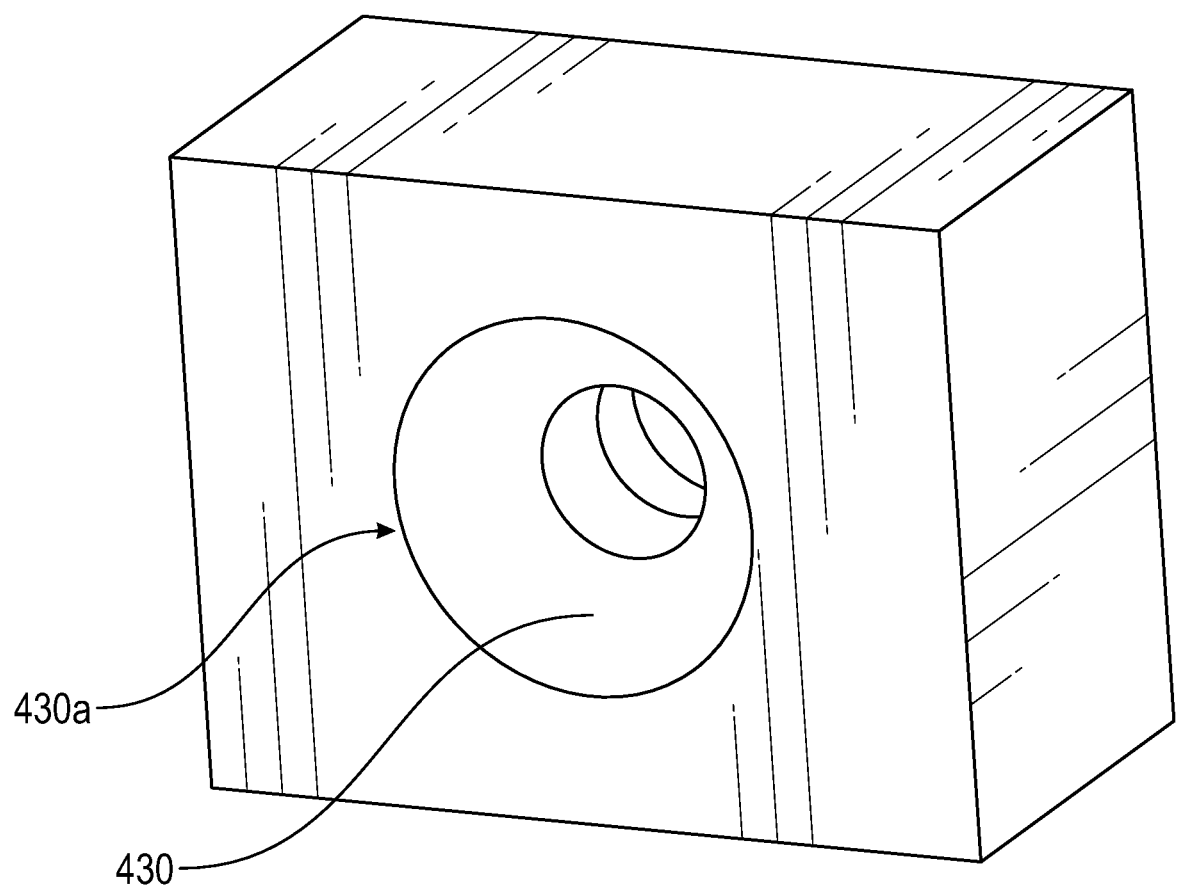
FIG. 6 illustrates an isometric view of the flared portion, in accordance with an embodiment of the present disclosure.

Referring now to FIGS. 5-6, a method 700 of forming the flared interior passageway 400 is illustrated in FIG. 5 and the flared portion 430 is illustrated in FIG. 6, in accordance with an embodiment of the present disclosure. At block 710, a bed housing 242 is formed with an outer surface 241 and an interior chamber 250.

At 720, a hole 290 is drilled in the outer surface into the bed housing 242 to the interior chamber 250 using a drill 910.

At 730, a backside spot face tool 920 is inserted through the hole 290. The backside spot face tool 920 includes a stem 922 and a cutting blade 930 that is extendable from the stem 922. The cutting blade 930 may extend from the stem 922 and compress back into the stem 922 to fit through the hole 290. The cutting blade 930 may extend from the stem once the stem 922 is located in the interior chamber 250.

At 740, the cutting blade 930 may be rotated to form the flared portion 430. The cutting blade 930 may be rotated and pulled into the chamber opening 252 to machine away the flared portion 430 from the bed housing 242. An isometric view of the flared portion 430 is illustrated in FIG. 6. In one embodiment, the cutting blade 930 may be rotated and pulled into the chamber opening 252 to machine away the flared portion 430 from the bed housing 242 all the way up to the first portion 410, leaving no straight portion 420. In another embodiment, the cutting blade 930 may be rotated and pulled into the chamber opening 252 to machine away the flared portion 430 from the bed housing 242 a first distance D1 away from the chamber opening 252, leaving a straight portion 420. FIG. 6 illustrates that the flared portion 430 is a countersink hole 430a.

At 750, one or more machining tools 950 may machine a counter bore 410a from the outer surface to form the first portion 410. FIG. 5 illustrates that the first portion 410 is a counter bore 410a.

While the above description has described the flow process of FIG. 5 in a particular order, it should be appreciated that unless otherwise specifically required in the attached claims that the ordering of the steps may be varied and the order of the steps may occur simultaneously or near simultaneously, such as in layers.

Technical effects and benefits of the features described herein include a swing bed comprising a flared passageway to aid entrance of amine-based sorbent beads in an interior chamber and egression of the amine-based sorbent beads from the interior chamber.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A swing bed absorption apparatus, comprising:
    a bed comprising:
        a bed housing comprising:
            an outer surface;
            an interior chamber;
            a flared interior passageway formed in the bed housing and fluidly connecting the interior chamber to an area located outside of the bed, the flared interior passageway comprising:
                an opening formed in the outer surface of the bed housing;
                a chamber opening formed in the bed housing at the interior chamber, with an interior passageway extending from the opening to the chamber opening;
                a first portion of the interior passageway located at the opening, the first portion being fluidly connected to the area located outside the bed through the opening; and
                a flared portion of the interior passageway located at the chamber opening, the flared portion being fluidly connected to the interior chamber through the chamber opening,
                wherein the flared portion connects to the interior chamber at an obtuse angle.

2. The swing bed absorption apparatus of claim 1, wherein the flared interior passageway further comprises:
    a straight portion interposed between the first portion and the flared portion, the straight portion fluidly connecting the first portion and the flared portion.

3. The swing bed absorption apparatus of claim 1, wherein the flared portion directly connects to the first portion.

4. The swing bed absorption apparatus of claim 1, wherein the flared portion is a countersink hole.

5. The swing bed absorption apparatus of claim 1, wherein the first portion is a counterbore.

6. A method of manufacturing a swing bed absorption apparatus, the method comprising:
    forming a bed, comprising:
        forming a bed housing comprising an outer surface and an interior chamber;
        forming a flared interior passageway in the bed housing, the flared interior passageway fluidly connecting the interior chamber to an area located outside of the bed, the flared interior passageway comprising:
            an opening formed in the outer surface of the bed housing;
            a chamber opening formed in the bed housing at the interior chamber, with an interior passageway extending from the opening to the chamber opening;
            a first portion of the interior passageway located at the opening, the first portion being fluidly connected to the area located outside the bed through the opening; and
            a flared portion of the interior passageway located at the chamber opening, the flared portion being fluidly connected to the interior chamber through the chamber opening,
            wherein the flared portion connects to the interior chamber at an obtuse angle.

7. The method of claim 6, wherein the forming the flared interior passageway further comprises:
    forming a straight portion, the straight portion being interposed between the first portion and the flared portion, wherein the straight portion fluidly connects the first portion and the flared portion.

8. The method of claim 7, wherein the forming the straight portion further comprises:
    drilling from the outer surface into the bed housing to form the straight portion.

9. The method of claim 6, wherein the forming the flared interior passageway further comprises:
    forming the flared portion.

10. The method of claim 9, wherein the forming the flared portion further comprises:
    machining a countersink hole from the chamber opening to form the flared portion.

11. The method of claim 9, wherein the forming the flared portion further comprises:
    drilling a hole in the outer surface into the bed housing to the interior chamber;
    inserting a backside spot face tool through the hole;
    extending a cutting blade from the backside spot face tool; and
    rotating the cutting blade to form the flared portion.

12. The method of claim 6, wherein the flared portion is a countersink hole.

13. The method of claim 6, wherein the forming the flared interior passageway further comprises:
    forming the first portion.

14. The method of claim 13, wherein the forming the first portion further comprises:
    machining a counter bore from the outer surface to form the first portion.

15. A swing bed absorption apparatus, comprising:
    a bed comprising:
        a bed housing comprising:
            an outer surface;

an interior chamber;
a metal foam contained in the bed housing;
a flared interior passageway fluidly connecting the interior chamber to an area located outside of the bed, the flared interior passageway comprising:
 an opening in the outer surface;
 a chamber opening at the interior chamber, wherein, the opening and the chamber opening together allow for filling the metal foam with amine based sorbent beads or for emptying amine based sorbent beads from the metal foam;
 a first portion located at the opening, the first portion being fluidly connected to the area located outside the bed through the opening; and
 a flared portion located at the chamber opening, the flared portion being fluidly connected to the interior chamber through the chamber opening,
 wherein the flared portion connects to the interior chamber at an obtuse angle.

16. The swing bed absorption apparatus of claim 15, wherein the flared interior passageway further comprises a straight portion interposed between the first portion and the flared portion, the straight portion fluidly connecting the first portion and the flared portion.

17. The swing bed absorption apparatus of claim 15, wherein the flared portion directly connects to the first portion.

18. The swing bed absorption apparatus of claim 15, wherein the flared portion is a countersink hole.

19. The swing bed absorption apparatus of claim 15, wherein the first portion is a counterbore.

* * * * *